US006337042B1

(12) United States Patent
Nakashima et al.

(10) Patent No.: US 6,337,042 B1

(45) Date of Patent: Jan. 8, 2002

(54) PRESS MACHINE AND METHOD OF MANUFACTURING PRESSED PRODUCTS

(75) Inventors: Suekazu Nakashima; Yasuo Kawano; Hideji Aoki, all of Tokyo (JP)

(73) Assignees: Mitsubishi Denki Kabushiki Kaisha; Mitsubishi Electric Engineering Co., Ltd., both of Tokyo (JP)

( * ) Notice: Subject to any disclaimer, the term of this patent is extended or adjusted under 35 U.S.C. 154(b) by 0 days.

(21) Appl. No.: 09/395,185

(22) Filed: Sep. 14, 1999

(30) Foreign Application Priority Data

Apr. 20, 1999 (JP) .......................................... 11-111714

(51) Int. Cl.[7] .......................... B29C 33/22; B29C 43/58

(52) U.S. Cl. ................... 264/40.5; 264/297.8; 318/625; 425/167; 425/233; 425/344; 425/346

(58) Field of Search ................................ 425/162, 163, 425/167, 233, 340, 343, 345, 344, 346, 352, 354; 264/40.5, 40.1, 297.1, 297.6, 297.8, 297.7; 318/625, 646, 650, 652, 689, 37

(56) References Cited

U.S. PATENT DOCUMENTS 4,257,103 A * 3/1981 Suzuki et al.
4,408,281 A * 10/1983 Tack, Jr. et al.
5,252,902 A * 10/1993 Uehara et al.
5,587,633 A * 12/1996 Aoki et al.
5,621,289 A * 4/1997 Doyama
5,842,257 A * 12/1998 Tashima et al. ....... 264/272.17
6,192,285 B1 * 2/2001 Takayama

* cited by examiner

*Primary Examiner*—Jill L. Heitbrink
(74) *Attorney, Agent, or Firm*—Oblon, Spivak, McClelland, Maier & Neustadt, P.C.

(57) ABSTRACT

An object is to reduce mutual interference between a plurality of sets of molds coupled to a common frame stand to improve the processing accuracy. A plurality of sets (e.g. two sets) of molds are driven by servo motors (6*a*, 6*b*). The servo motors (6*a*, 6*b*) are individually controlled by servo amplifiers (8*a*, 8*b*), respectively. A control portion in the servo amplifier (8*a*) calculates a current (I) so that the measured value (X) of the rotating position of the servo motor (6*a*) follows a directing value (X0) sent from a CPU through a pulse generator (9). A torque detecting/limiting portion (25) limits the calculated current (I) so that a limit value of the torque sent from the CPU through a DA converter (12) is not exceeded and sends it to the servo motor (6*a*) through a current amplifier (26). When the torque of the servo motor (6*a*) reaches the limit value after the molds come in contact, the directing value (X0) is rapidly advanced in the mold-losing direction.

8 Claims, 14 Drawing Sheets

PRIOR ART FIG. 6
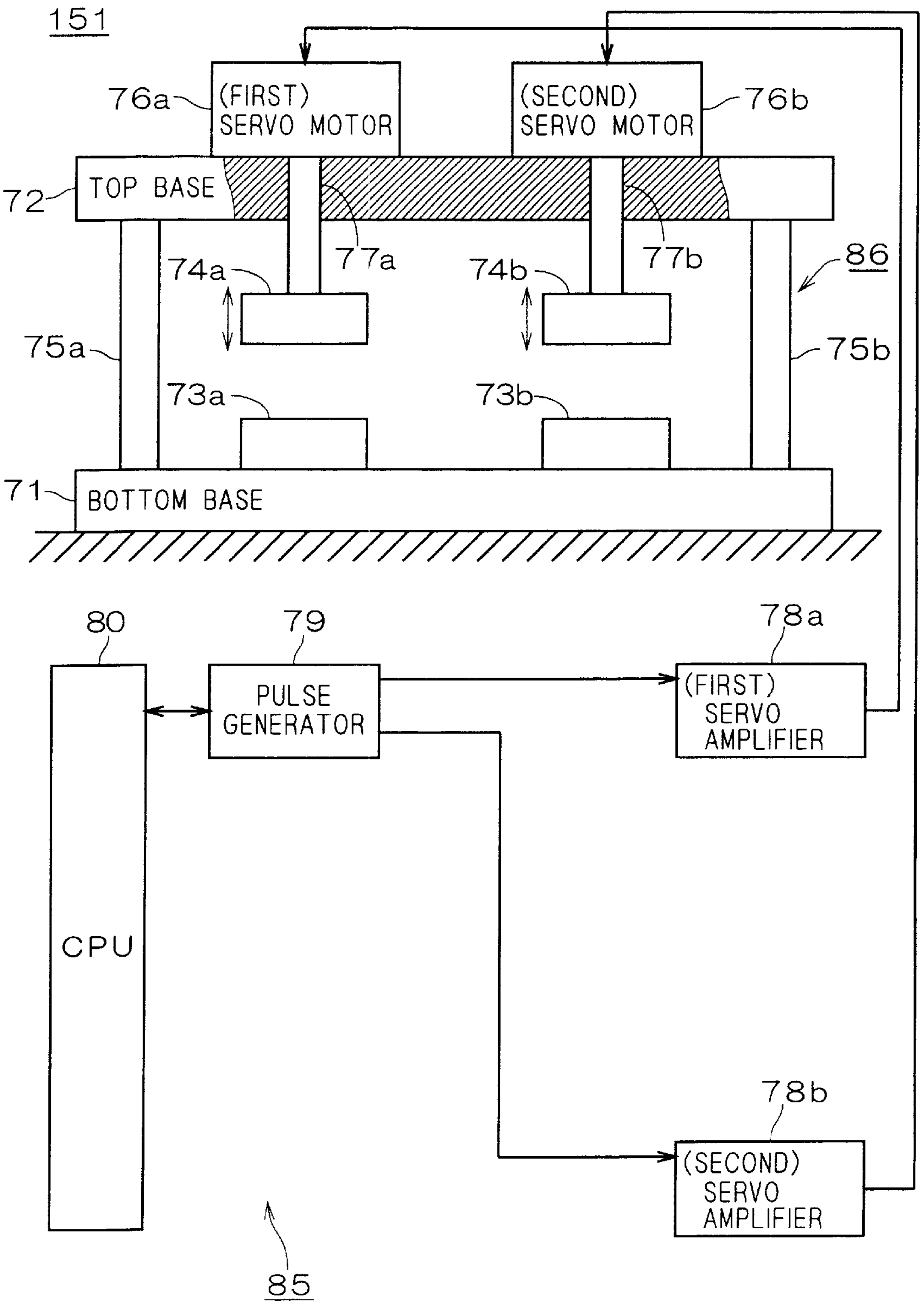

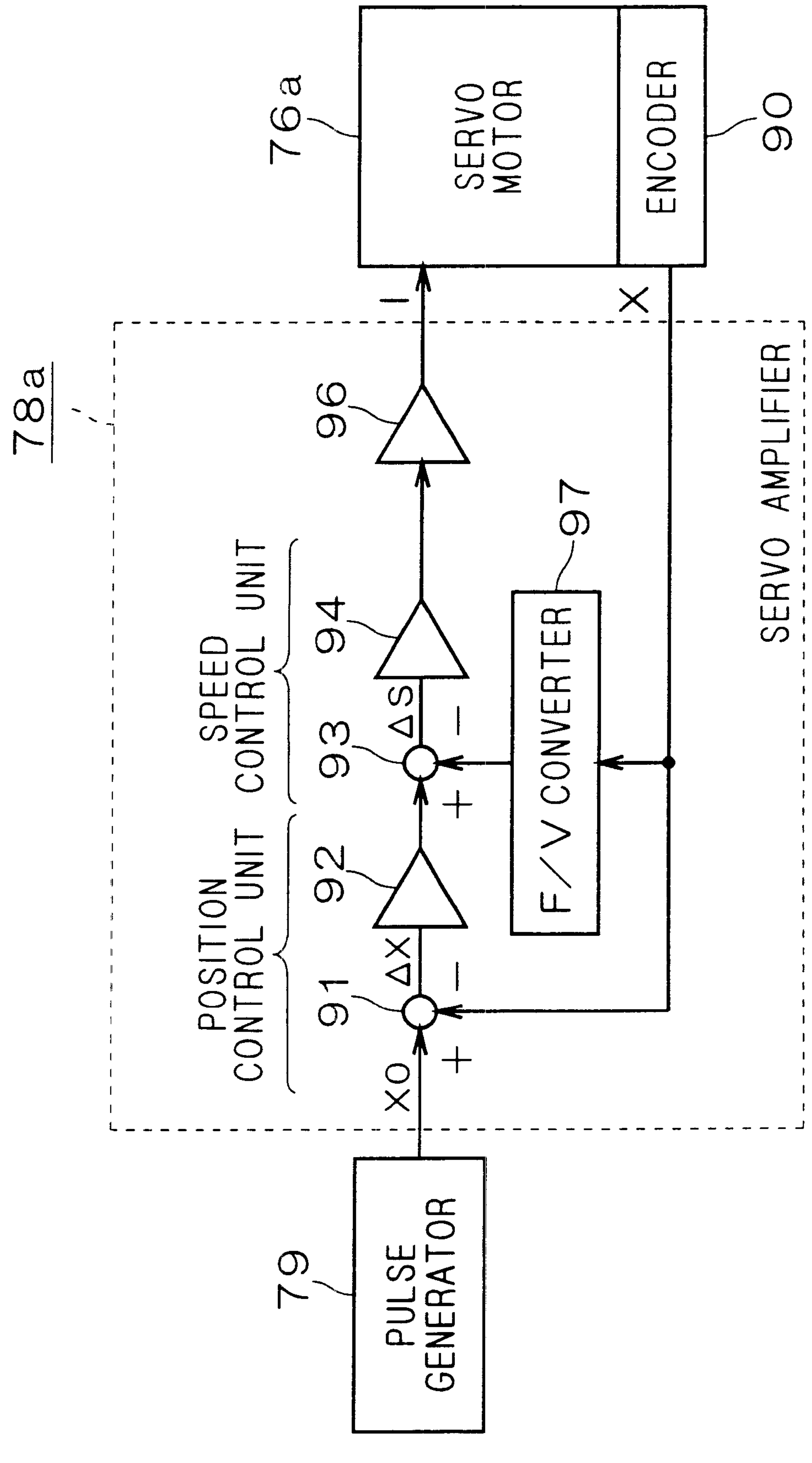
PRIOR ART *FIG. 7*

PRIOR ART FIG. 8
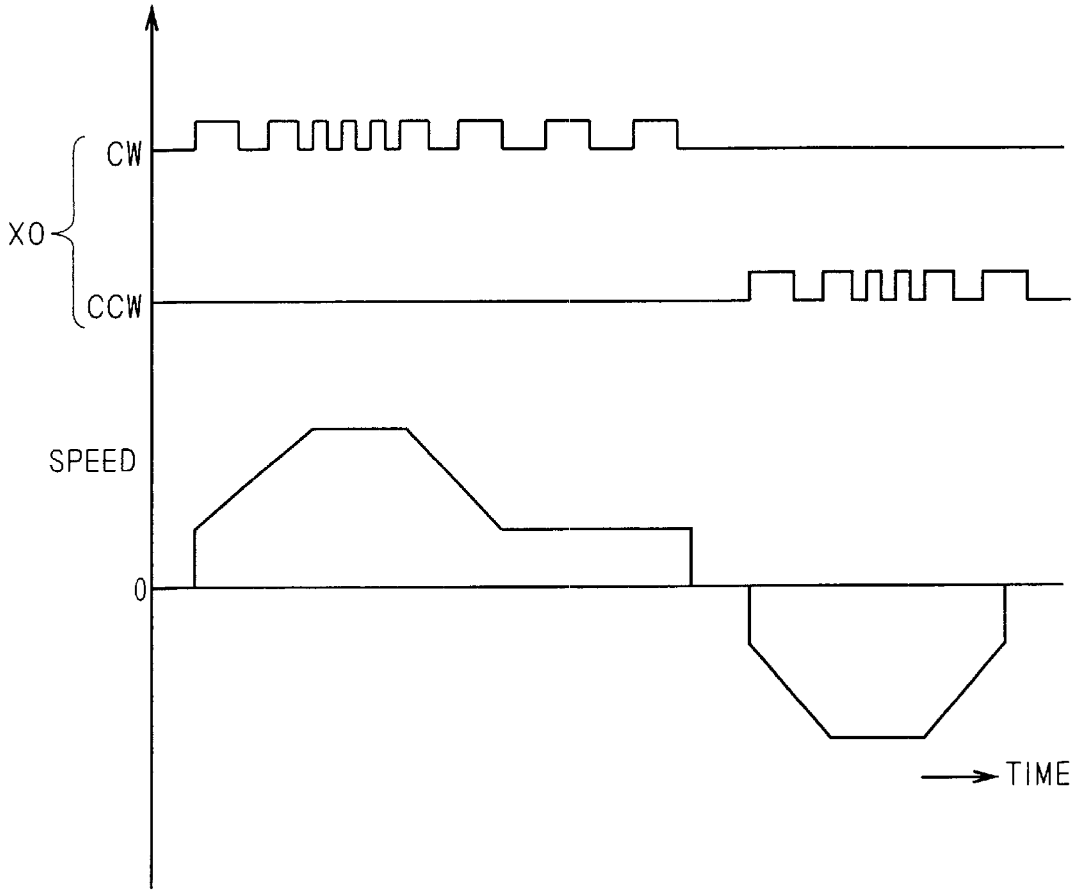

PRIOR ART FIG. 9
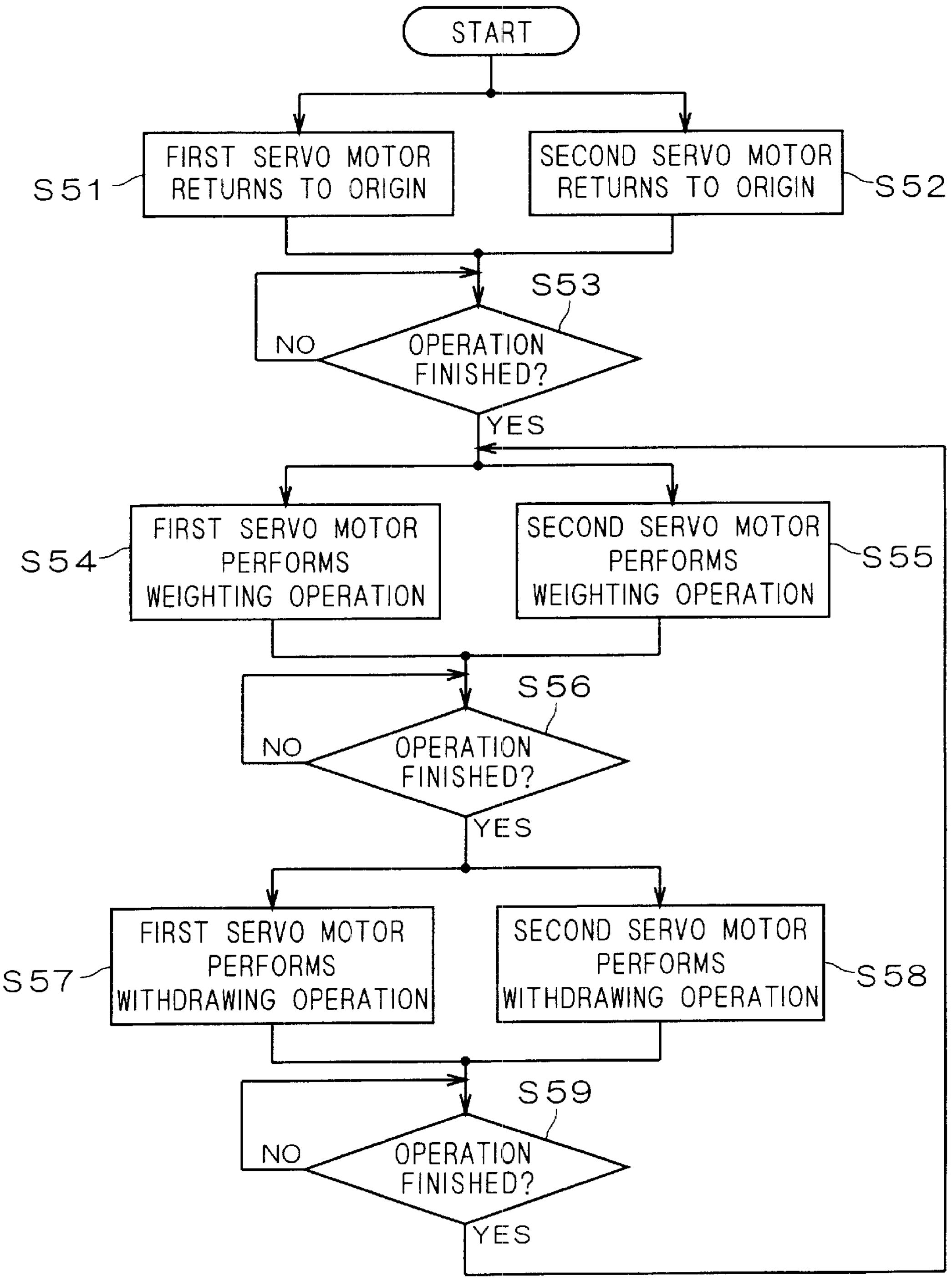

PRIOR ART FIG. 10
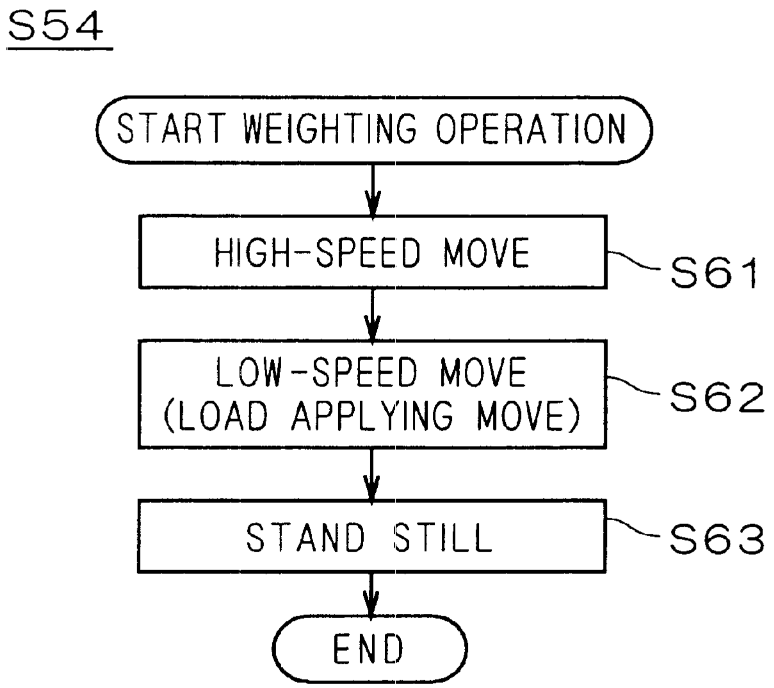
PRIOR ART FIG. 11
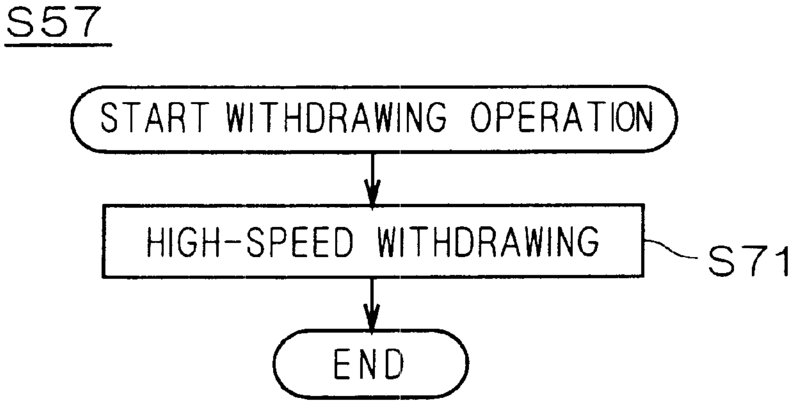

PRIOR ART FIG. 12
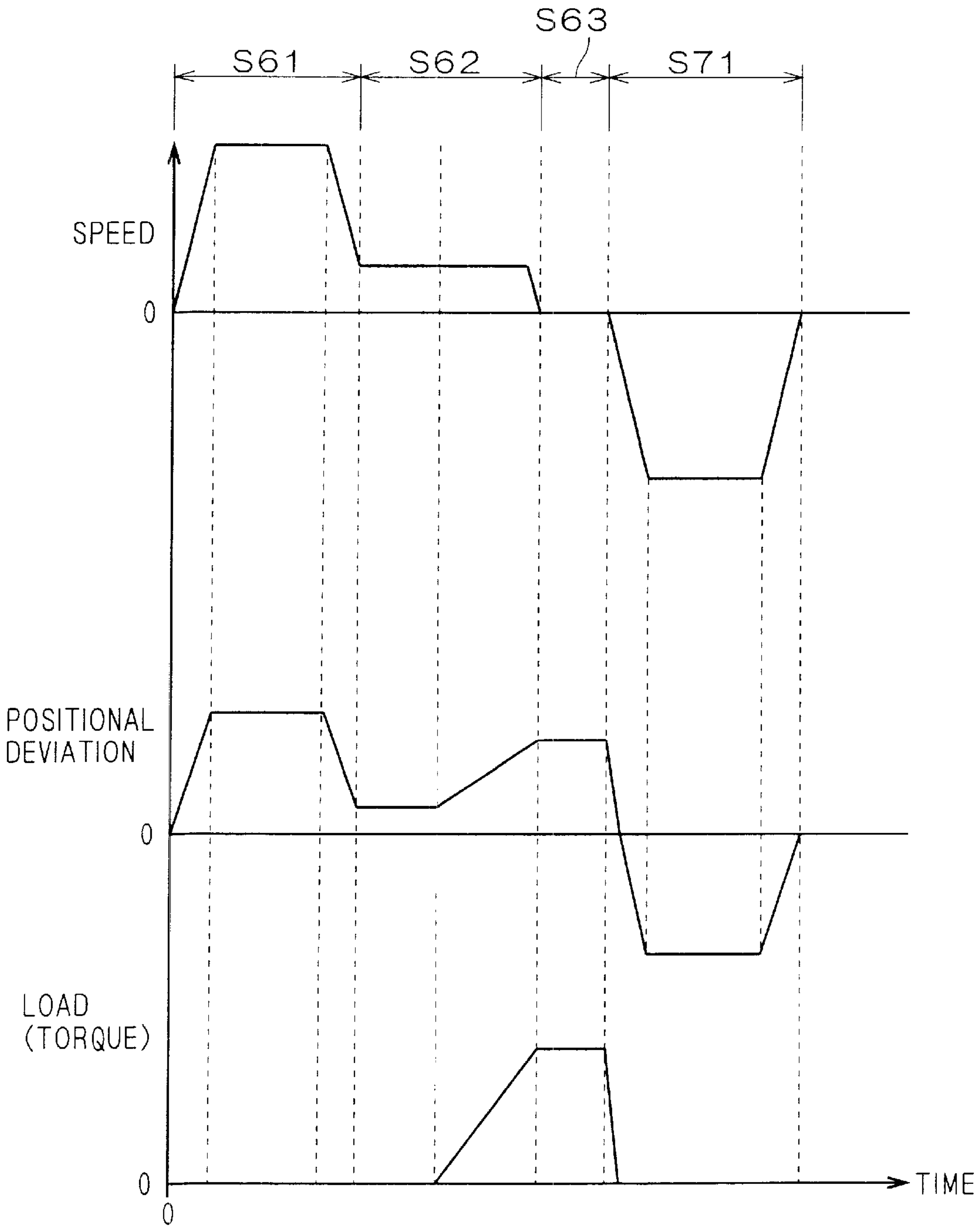

PRIOR ART FIG. 13
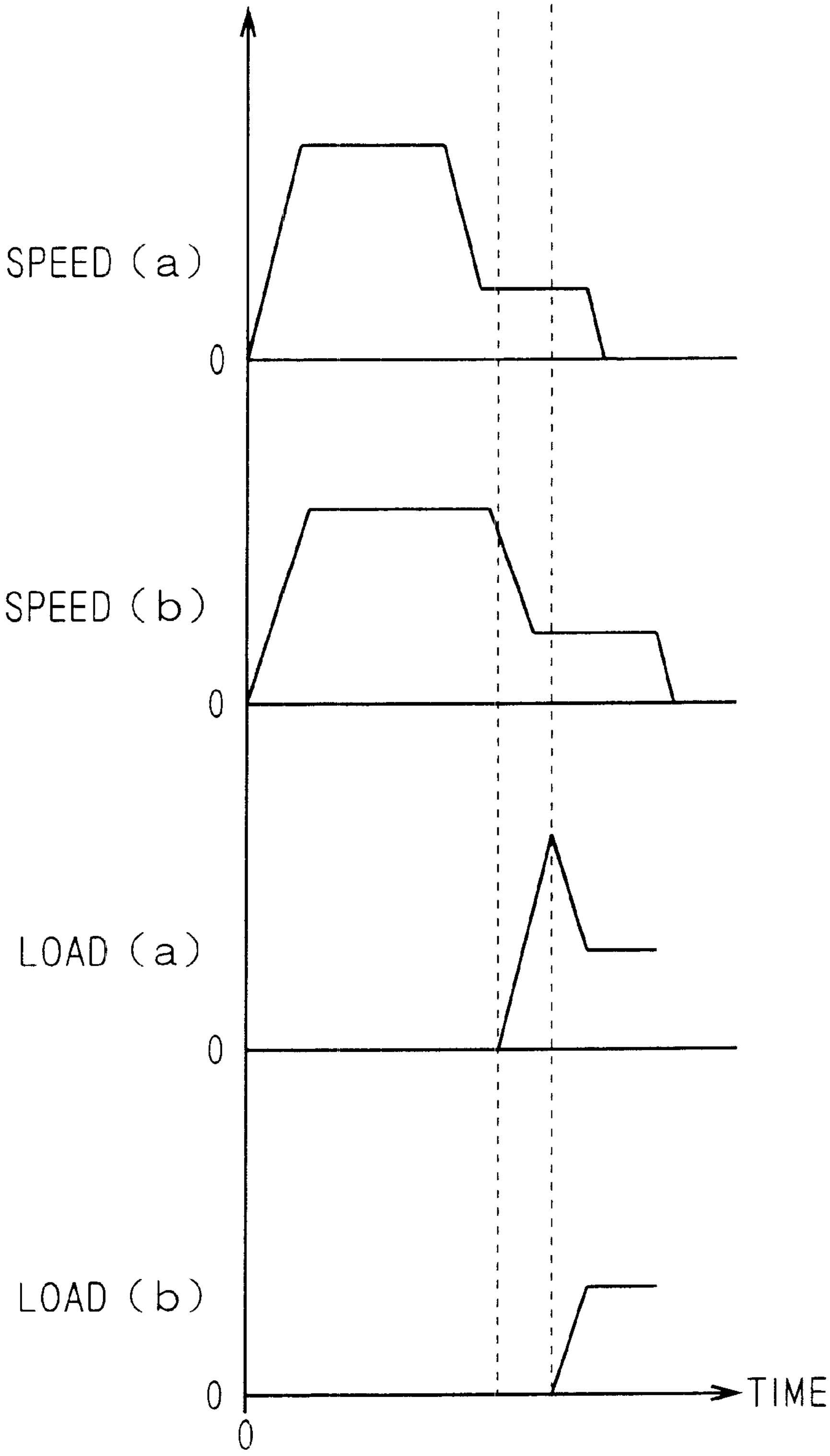

PRIOR ART FIG. 14
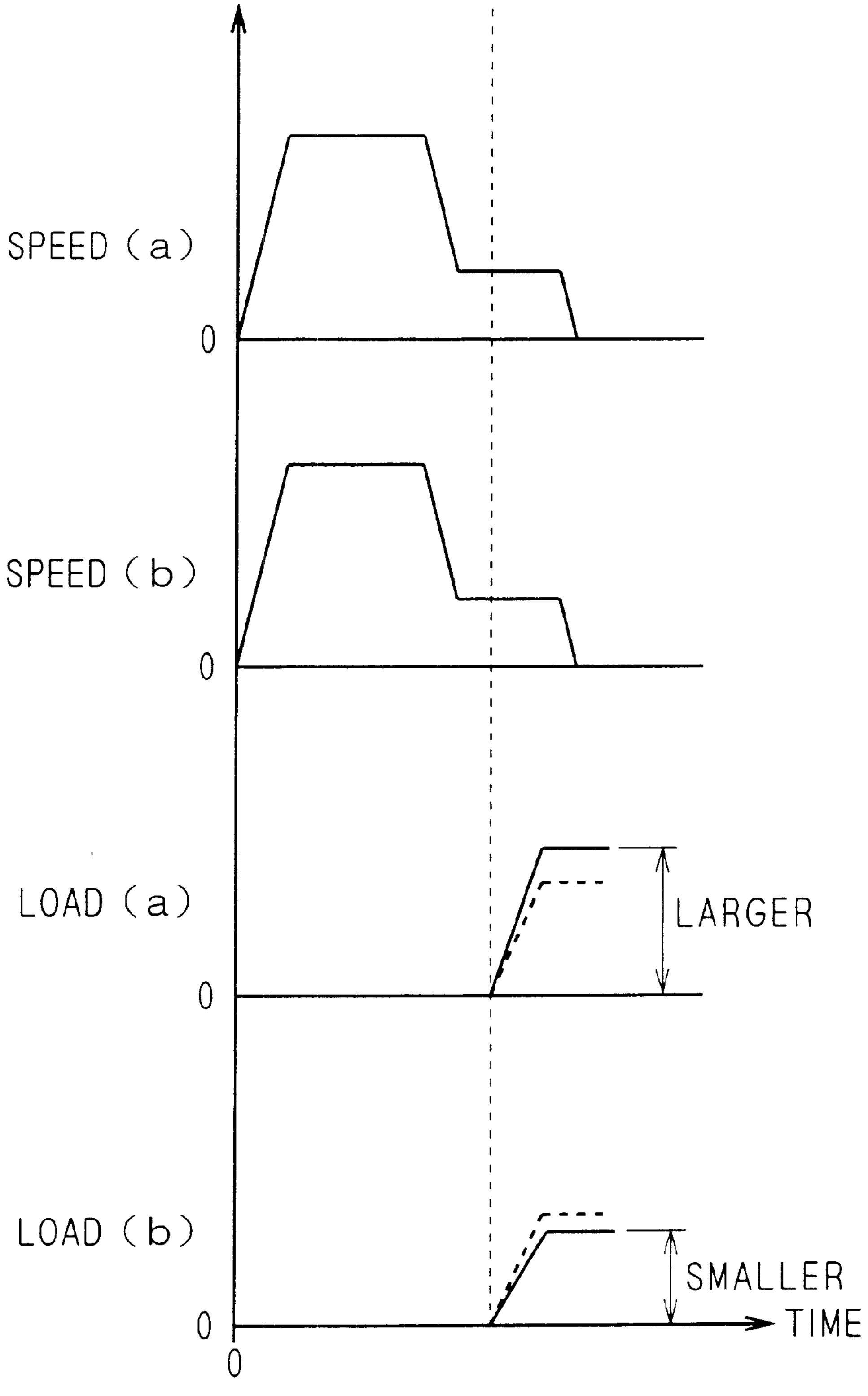

PRIOR ART FIG. 15
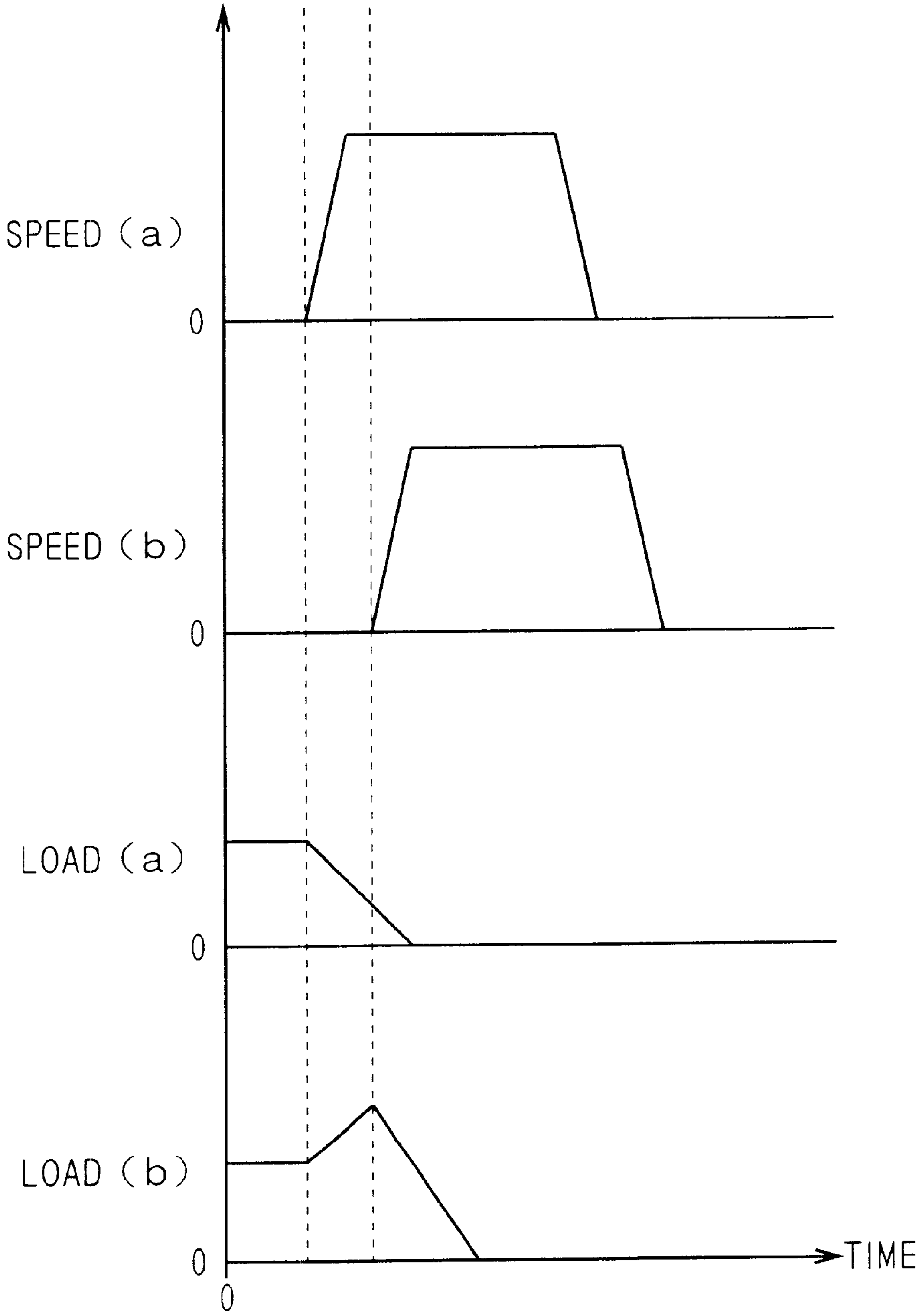

PRIOR ART FIG. 16
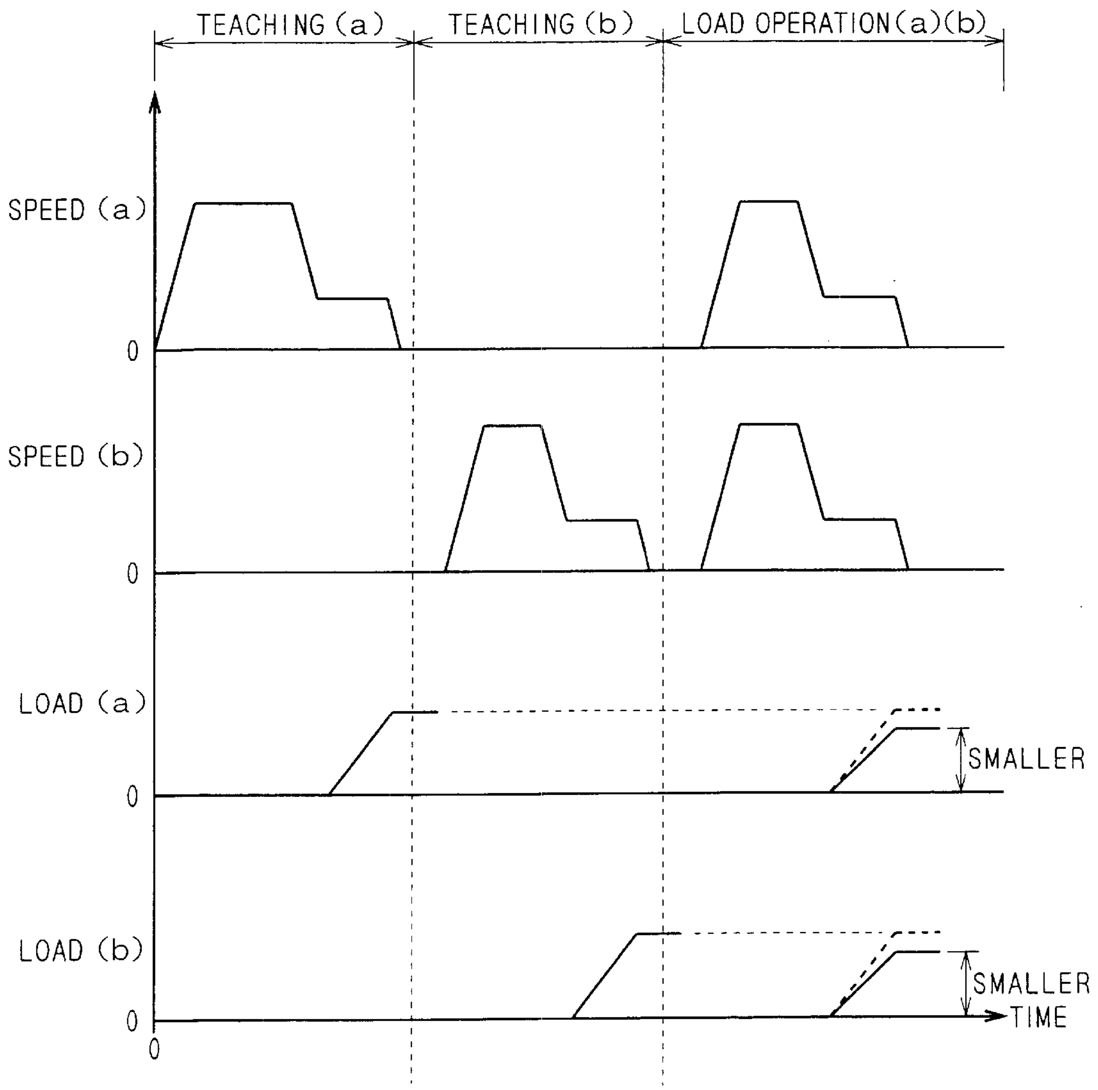

PRESS MACHINE AND METHOD OF MANUFACTURING PRESSED PRODUCTS

BACKGROUND OF THE INVENTION

1. Field of the Invention

The present invention relates to a press machine and a method of manufacturing pressed products, and particularly to an improvement for reducing mutual interference between a plurality of sets of molds to enhance the processing accuracy.

2. Description of the Background Art

FIG. 6 is an explanation diagram showing the structure of a conventional press machine as a background of the invention. This machine 151 has a bottom base 71 installed on the floor, a pair of supports 75*a* and 75*b* uprightly provided on the bottom base 71, and a top base 72 supported on the supports 75*a* and 75*b*. The bottom base 71, supports 75*a* and 75*b*, and top base 72 fixedly coupled to each other form a frame stand 86. A pair of fixed molds 73*a* and 73*b* are fixed on the bottom base 71. Fixed on the top base 72 are a pair of a (first) servo motor 76*a* and a (second) servo motor 76*b*.

The servo motors 76*a* and 76*b* are respectively in mesh with ball threads 77*a* and 77*b*, which rotate to individually drive the ball threads 77*a* and 77*b* in the vertical direction. Moving molds 74*a* and 74*b* are fixed at the lower ends of the ball threads 77*a* and 77*b*, respectively.

The moving molds 74*a* and 74*b* are located right above the fixed molds 73*a* and 73*b* to face the fixed molds 73*a* and 73*b*, respectively. The servo motors 76*a* and 76*b* rotate in the normal rotation and reverse rotation directions to move the moving molds 74*a* and 74*b* in the mold-closing direction (i.e. downward) and in the mold-opening direction (i.e. upward).

The servo motors 76*a* and 76*b* are supplied with current (i.e., electric current) from a (first) servo amplifier 78*a* and a (second) servo amplifier 78*b*, respectively. The servo amplifiers 78*a* and 78*b* are individually controlled by an amplifier controlling unit 85, so that the magnitudes of currents supplied to the servo motors 76*a* and 76*b* are controlled individually. The amplifier controlling unit 85 includes a CPU 80 and a pulse generator 79.

FIG. 7 is a block diagram showing the inside structure of the servo amplifier 78*a*, which is representative of the servo amplifiers 78*a* and 78*b*. The servo amplifier 78*a* is supplied with a directing value X0 related to the operating position of the servo motor 76*a* (i.e. the rotating position of the rotor) from the pulse generator 79 and a measured value X related to the operating position of the servo motor 76*a* from an encoder 90.

As shown in the timing chart of FIG. 8, the directing value X0 is represented by the number of pulses along the time series. A normal rotation directing signal CW is outputted in pulse form when directing that the servo motor 76*a* should operate in the normal rotation direction, and a reverse rotation directing signal CCW is outputted in pulse form when directing that it should operate in the reverse rotation direction. The cumulative value of the difference between the number of pulses of the normal rotation directing signal CW and the number of pulses of the reverse rotation directing signal CCW corresponds to the directing value X0 related to the operating position of the servo motor 76*a*.

The rate of change of the directing value X0 corresponds to the target value of the operating speed of the servo motor 76*a* (i.e. its rotating speed), which is proportional to the pulse frequency as shown in FIG. 8. The encoder 90 outputs pulses of the same form in correspondence with the amount of operation of the servo motor 76*a* (i.e. the amount of rotation of the rotor).

Referring to FIG. 7 again, the subtracter 91 calculates the difference between the directing value X0 and the measured value X and outputs the calculated value as a positional deviation ΔX. The amplifier 92 amplifiers the positional deviation ΔX. The subtracter 91 and the amplifier 92 form a position controlling unit. The F/V converter 97 converts the rate of time change in the measured value X, i.e., the frequency of the pulses representing the measured value X to a voltage signal. The subtracter 93 calculates the difference between the output signal from the amplifier 92 and the output signal from the F/V converter 97 and outputs the calculated value as a speed deviation ΔS. The amplifier 94 amplifies the speed deviation ΔS. The subtracter 93, amplifier 94 and F/V converter 97 form a speed controlling unit.

The output signal from the amplifier 94 is inputted to a current amplifier 96. The current amplifier 96 amplifies the input signal and supplies a current I proportional in magnitude to the input signal to the servo motor 76*a*. Thus the current I is controlled so that the measured value X follows the directing value X0 at speed proportional to the difference between the measured value X and the directing value X0 . The CPU 80 shown in FIG. 6 executes arithmetic processing and the directing value X0 is outputted through the pulse generator 79 on the basis of the value calculated in the arithmetic processing. The operation of the servo motor 76*a* is thus controlled.

FIG. 9 is a flowchart showing the procedure of the arithmetic processing performed by the CPU 80. When the arithmetic processing is started, first, the processings in steps S51 and S52 are simultaneously executed. Specifically, the servo motors 76*a* and 76*b* are driven to return to the origin (the initial position). This processing is continued until they have returned to the origin (step S53), and the process moves to steps S54 and S55 after it is finished. When they have returned to the origin, the moving molds 74*a* and 74*b* are positioned at the standby position separated above the fixed molds 73*a* and 73*b*.

In the following steps S54 and S55, the servo motors 76*a* and 76*b* are driven to perform weighting operation. Then the moving molds 74*a* and 74*b* move in the mold-closing direction to respectively hit on the fixed molds 73*a* and 73*b*, and they are further pressurized for the press work. Steps S54 and S55 are simultaneously executed. These processes are executed until the press work is completed (step S56). When the press work has been finished, the process moves to steps S57 and S58.

In steps S57 and S58, the servo motors 76*a* and 76*b* are driven to perform withdrawing operation. Then the moving molds 74*a* and 74*b* move in the mold-opening direction to return to the standby position. The steps S57 and S58 are carried out at the same time. These processes are continued until they return to the standby position (step S59). When they have returned, the process moves to steps S54 and S55 again. The above-described processes are repeated to repeatedly carry out the press work.

FIG. 10 is a flowchart showing the internal flow in step S54, which is representative of steps S54 and S55. Similarly, FIG. 11 shows a flowchart showing the internal flow in step S57, which is representative of steps S57 and S58. FIG. 12 is a timing chart showing variations in the target value of the operating speed (i.e. the changing rate of the directing value X0), the positional deviation ΔX, and the torque of the servo motor 76*a* that are caused in the weighting operation of step S54 and the withdrawing operation of step S57. Now, referring to FIGS. 10 to 12, the weighting operation and withdrawing operation of the machine 151 will be described.

When the weighting operation based on the processing in step S54 is started, first, the moving mold 74*a* is driven to move in the mold-closing direction at high speed (step S61). At this time, the target value of the operating speed first increases from zero, stays at a high value when the directing value X0 reaches a given reference value, and then decreases when the directing value X0 reaches another reference value. Subsequently, the target value of the operating speed is maintained at a low value (step S62).

The reference values for defining the operating positions at which the target value of the operating speed is changed are previously set through teaching performed prior to the processing in FIG. 9. The reference value defining the timing for changing from the high-speed moving operation based on step S61 to the low-speed moving operation based on step S62 is set so that the moving mold 74*a* is located at such a position that it does not abut on the fixed mold 73*a* when the directing value X0 reaches that reference value. Hence the moving mold 74*a* moves at high speed from the standby position toward the fixed mold 73*a*, whose speed decreases before it hits the fixed mold 73*a*, and then the moving mold 74*a* moves at low speed toward the fixed mold 73*a*. This reduces the impact produced when the moving mold 74*a* and the fixed mold 73*a* hits on each other.

The moving mold 74*a* hits on the fixed mold 73*a* at a certain point of time in the low-speed moving operation. While the moving mold 74*a* moves at speed approximately equal to the target value until it hits on the fixed mold 73*a*, it cannot maintain the speed corresponding to the target value after hitting. Accordingly, after hitting, the positional deviation $\Delta X$ increases. Then the speed deviation $\Delta S$ increases accordingly and the current I increases. As a result, the torque of the servo motor 76*a* increases. That is to say, the moving mold 74*a* is pressurized against the fixed mold 73*a* with an increasing pressing force.

After that, when the directing value X0 reaches another reference value, the operating-speed target value decreases toward zero. Then the process moves to step S63 and the operating-speed target value is maintained at zero. That is to say, the directing value X0 is held at a constant value. At this time, the moving mold 74*a* is pressed against the fixed mold 73*a* by a constant pressing force. The press work is carried out throughout from the beginning of pressing to the standing-still operation. The standing-still operation is ended when a previously set certain time has elapsed and the process moves to step S57.

In step S57, the moving mold 74*a* is driven to move at high speed in the mold-opening direction (step S71). During this operation, the operating-speed target value first increases from zero, stays at high value when the directing value X0 reaches a given reference value, and then decreases to zero when the directing value X0 reaches another reference value. The number of pulses of the reverse rotation directing signal CCW outputted as the directing value X0 in the high-speed withdrawing operation based on step S57 is equal to the number of pulses of the normal rotation directing signal CW outputted in step S61 (high-speed moving operation) and step S62 (low-speed moving operation). Then the pressing force applied to the moving mold 74*a* is quickly released and thereafter the moving mold 74*a* returns to the standby position at high speed.

The conventional machine 151 operates as described above to realize efficient press work while reducing impact between the moving molds 74*a* and 74*b* and the fixed molds 73*a* and 73*b*.

However, since the two fixed molds 73*a* and 73*b* and the two servo motors 76*a* and 76*b* are provided on the single frame stand 86, the conventional machine 151 has the following problems. FIGS. 13 to 16 are timing charts used to explain the problems. In FIGS. 13 to 16, the speeds (a) and (b) represent the moving speeds of the moving molds 74*a* and 74*b* and the loads (a) and (b) represent the pressing forces applied to the moving molds 74*a* and 74*b*, respectively.

As stated above, the CPU 80 sends the directing value X0 to the servo amplifiers 78*a* and 78*b* so that the moving molds 74*a* and 74*b* arrive at the fixed molds 73*a* and 73*b* at the same time in the weighting operation. However, because of deflections of the bases 71 and 72, difference in capability between the servo motors 76*a* and 76*b*, slight errors in the transmission mechanism from the servo motors 76*a* and 76*b* to the moving molds 74*a* and 74*b*, and some other reasons, the moving molds 74*a* and 74*b* do not always arrive at the fixed molds 73*a* and 73*b* at the same time.

For example, as shown in FIG. 13, when the moving mold 74*a* arrives at the fixed mold 73*a* earlier than the moving mold 74*b* arrives at the fixed mold 73*b*, the moving mold 74*b* arrives at the fixed mold 73*b* after the moving mold 74*a* has arrived at the fixed mold 73*a*, in which case an excessive pressing force is applied to the moving mold 74*a* in the period before the pressing force to the moving mold 74*b* increases to a certain extent. This excessive load serves as a factor that reduces the processing accuracy in the pressing work.

Furthermore, using the machine 151 in a long time will cause deformation of the bases 71 and 72, variations in the characteristics of the servo motors 76*a* and 76*b*, wear of the transmission mechanism, and the like. Even if the simultaneous arrival is maintained, the deformation, variations, wear, etc. of the parts of the machine produced in long time use may cause inequality in pressing force between the moving molds 74*a* and 74*b*, as shown in FIG. 14. This inequality serves to reduce the accuracy of the press work, too.

Moreover, in the withdrawing operation, the moving molds 74*a* and 74*b* may separate from the fixed molds 73*a* and 73*b* at different points of time because of deflections of the bases 71 and 72, difference in capability between the servo motors 76*a* and 76*b*, slight errors in the transmission mechanism from the servo motors 76*a* and 76*b* to the moving molds 74*a* and 74*b*, and other reasons. For example, when the moving mold 74*a* separates from the fixed mold 73*a* earlier than the moving mold 74*b* separates from the fixed mold 73*b* as shown in FIG. 15, an excessive pressing force is applied to the moving mold 74*b* in the period from when the moving mold 74*a* starts withdrawing to when the moving mold 74*b* withdraws to some extent. This excessive load serves as a factor that reduces the accuracy of the press work, too.

Further, in the machine 151, the above-mentioned teaching is carried out individually to the two servo motors 76*a* and 76*b*. Specifically, the reference values for the directing value X0 directing the servo amplifier 78*a* and the reference values for the directing value X0 directing the servo amplifier 78*b* are separately set. The CPU 80 sends the directing value X0 individually to the servo amplifiers 78*a* and 78*b* while referring to the reference values set in this way. It is thereby attempted to improve the processing accuracy.

However, as shown in FIG. 16, when the reference values are set so that predetermined target load (pressing force) can be obtained through teaching (a) to the servo motor 76*a* and teaching (b) to the servo motor 76*b* that are separately performed, the pressing forces applied to the moving molds 74*a* and 74*b* may become lower than the target value in the following processing shown in FIG. 9. This is caused because the magnitude of deflection (the amount of deflection) occurring in the bases 71 and 72 differs between when the pressing force is applied to one of the moving molds 74*a* and 74*b* and when it is simultaneously applied to both.

As described above, the conventional press machine in which a plurality of sets of molds are coupled to a common frame stand has the problem that improvement of pressing accuracy is hindered because of mutual interference between the plurality of sets of molds.

SUMMARY OF THE INVENTION

A first aspect of the present invention is directed to a press machine having a plurality of fixed molds and a plurality of motors provided on a common stand, wherein the plurality of motors individually drive moving molds respectively in pairs with the plurality of fixed molds to perform press work. According to the present invention, the press machine comprises: a plurality of amplifiers for passing current individually through the plurality of motors; and an amplifier controlling portion for individually controlling the plurality of amplifiers to realize weighting operation of moving the plurality of moving molds in mold-closing direction and pressing the plurality of moving molds respectively against the plurality of fixed molds and withdrawing operation of moving the plurality of moving molds in mold-opening direction. Each of the plurality of amplifiers comprises a control portion for calculating an amount of current to be passed through a corresponding one of the plurality of motors so that a measured value of operating position of the corresponding motor follows a directing value, and a torque control portion for sending the amount of the current calculated by the control portion to the corresponding motor while limiting the same so that torque of the corresponding motor does not exceed a limit value, wherein in the weighting operation, the amplifier controlling portion further advances the directing value for each of the plurality of amplifiers in the mold-closing direction after the torque reaches the limit value.

Preferably, according to a second aspect of the present invention, in the press machine, in the weighting operation, the amplifier controlling portion advances the directing value for each of the plurality of amplifiers in the mold-closing direction before the torque reaches the limit value and lowers rate of change in the directing value before corresponding pair of the moving and fixed molds come in contact.

Preferably, according to a third aspect of the present invention, in the press machine, in the weighting operation, the amplifier controlling portion raises up the rate of change in the directing value for each of the plurality of amplifiers after the torque reaches the limit value.

Preferably, according to a fourth aspect of the present invention, in the press machine, in the weighting operation, the amplifier controlling portion lowers the limit value for each of the plurality of amplifiers at the same time as lowering the rate of change in the directing value before the corresponding pair of the moving and fixed molds come in contact.

Preferably, according to a fifth aspect of the present invention, in the press machine, in the withdrawing operation, the amplifier controlling portion advances the directing value for each of the plurality of amplifiers in the mold-opening direction while maintaining the limit value until corresponding pair of the moving and fixed molds open by a given amount or more, and then raises the limit value.

A sixth aspect of the present invention is directed to a method of manufacturing pressed products, and the method manufactures the pressed products by performing press work by using the press machine.

According to the machine of the first aspect, the directing value is further advanced in the mold-closing direction after the torque reaches the limit value, so that the effect of mutual interference between the plurality of sets of molds can be absorbed to perform the press work with stable load. This enhances the accuracy of the press work.

According to the machine of the second aspect, while the directing value is advanced in the mold-closing direction in the weighting operation, the rate of change in the directing value is lowered before the molds come in contact, i.e., mold contact occurs, which improves the efficiency of the work while avoiding impact caused as the mold.

According to the machine of the third aspect, the rate of change in the directing value is raised up after the torque reaches the limit value, so that a state with highly stable load can be realized quickly. Accordingly, even if the plurality of sets of molds come in contact at different points of time, it is possible to more effectively avoid intensive application of excessive load to a part of the sets.

According to the machine of the fourth aspect, in the weighting operation, the limit value of the torque is lowered at the same time as the speed of movement of the moving molds is lowered before the mold contact, so that the load can be stabilized in the press work and the travel of the moving molds can be finished in shorter time, thus further improving the efficiency of the work.

According to the machine of the fifth aspect, in the withdrawing operation, the limit value of the torque is maintained until the molds open by a given amount or more, and then the limit value of the torque is raised. Accordingly, even if the plurality of sets of molds separate at different points of time, it is possible to more effectively avoid intensive application of excessive load to a part of the sets.

According to the manufacturing method of the sixth aspect, it is possible to obtain pressed products with excellent processing accuracy.

The present invention has been made to solve the above-described problems in the background art, and an object of the present invention is to reduce mutual interference between a plurality of sets of molds to provide a press machine and a pressed product manufacturing method with improved processing accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an explanation diagram showing the structure of a conventional machine.

FIG. 7 is an internal block diagram showing the servo amplifier of FIG. 6.

FIG. 8 is a timing chart used to explain operation of the machine of FIG. 6.

FIG. 9 is a flow chart showing the procedure of arithmetic processing by the CPU in FIG. 6.

FIGS. 10 and 11 are flow charts showing the procedures of steps S54 and S57 of FIG. 9, respectively.

FIG. 12 is a timing chart used to explain operation of the machine of FIG. 6.

FIGS. 13 to 16 are timing charts used to explain problems of the machine of FIG. 6.

DESCRIPTION OF THE PREFERRED EMBODIMENTS

1. Structure

Figure 1:
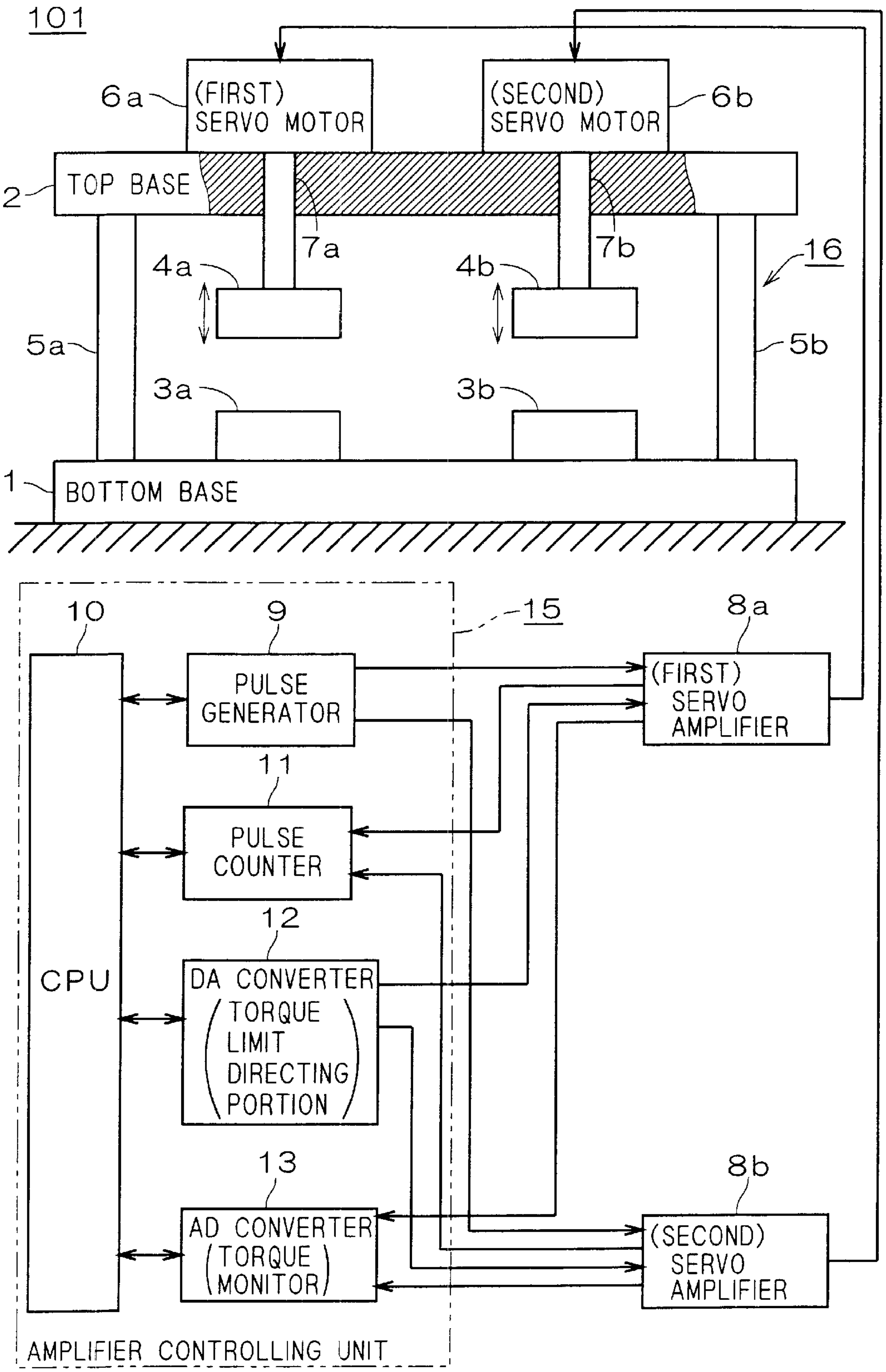
FIG. 1 is an explanation diagram showing the structure of a machine of a preferred embodiment.

FIG. 1 is an explanation diagram showing the structure of a press machine according to a preferred embodiment of the present invention. This machine 101 has a bottom base 1 installed on the floor, a pair of supports 5*a* and 5*b* uprightly provided on the bottom base 1, and a top base 2 supported on the supports 5*a* and 5*b*. The bottom base 1, supports 5*a* and 5*b*, and top base 2 fixedly coupled to each other form a frame stand 16. A pair of fixed molds 3*a* and 3*b* are fixed on the upper surface of the bottom base 1.

A pair of a (first) servo motor 6*a* and a (second) servo motor 6*b* are fixed on the top base 2, which are located above the fixed molds 3*a* and 3*b*, respectively. The servo motors 6*a* and 6*b* are respectively in mesh with ball threads 7*a* and 7*b*, which rotate to individually drive the ball threads 7*a* and 7*b* in the vertical direction. Moving molds 4*a* and 4*b* are fixed at the lower ends of the ball threads 7*a* and 7*b*, respectively.

The moving molds 4*a* and 4*b* are located right above the fixed molds 3*a* and 3*b* to face the fixed molds 3*a* and 3*b*, respectively. The servo motors 6*a* and 6*b* rotate in the normal rotation and reverse rotation directions to move the moving molds 4*a* and 4*b* in the mold-closing direction (i.e. downward) and in the mold-opening direction (i.e. upward).

The servo motors 6*a* and 6*b* are supplied with (electric) current from a (first) servo amplifier 8*a* and a (second) servo amplifier 8*b*, respectively. The servo amplifiers 8*a* and 8*b* are individually controlled by an amplifier controlling unit 15, so that the magnitudes of currents supplied to the servo motors 6*a* and 6*b*, i.e., the amounts of passed currents are controlled individually. The amplifier controlling unit 15 includes a CPU 10, a pulse generator 9, a pulse counter 11, a DA converter 12 as a torque limit directing portion, and an AD converter 13 as a torque monitor. The amplifier controlling unit 15 realizes given operation of the moving molds 4*a* and 4*b* through the servo amplifiers 8*a* and 8*b* and the servo motors 6*a* and 6*b*.

Figure 2:
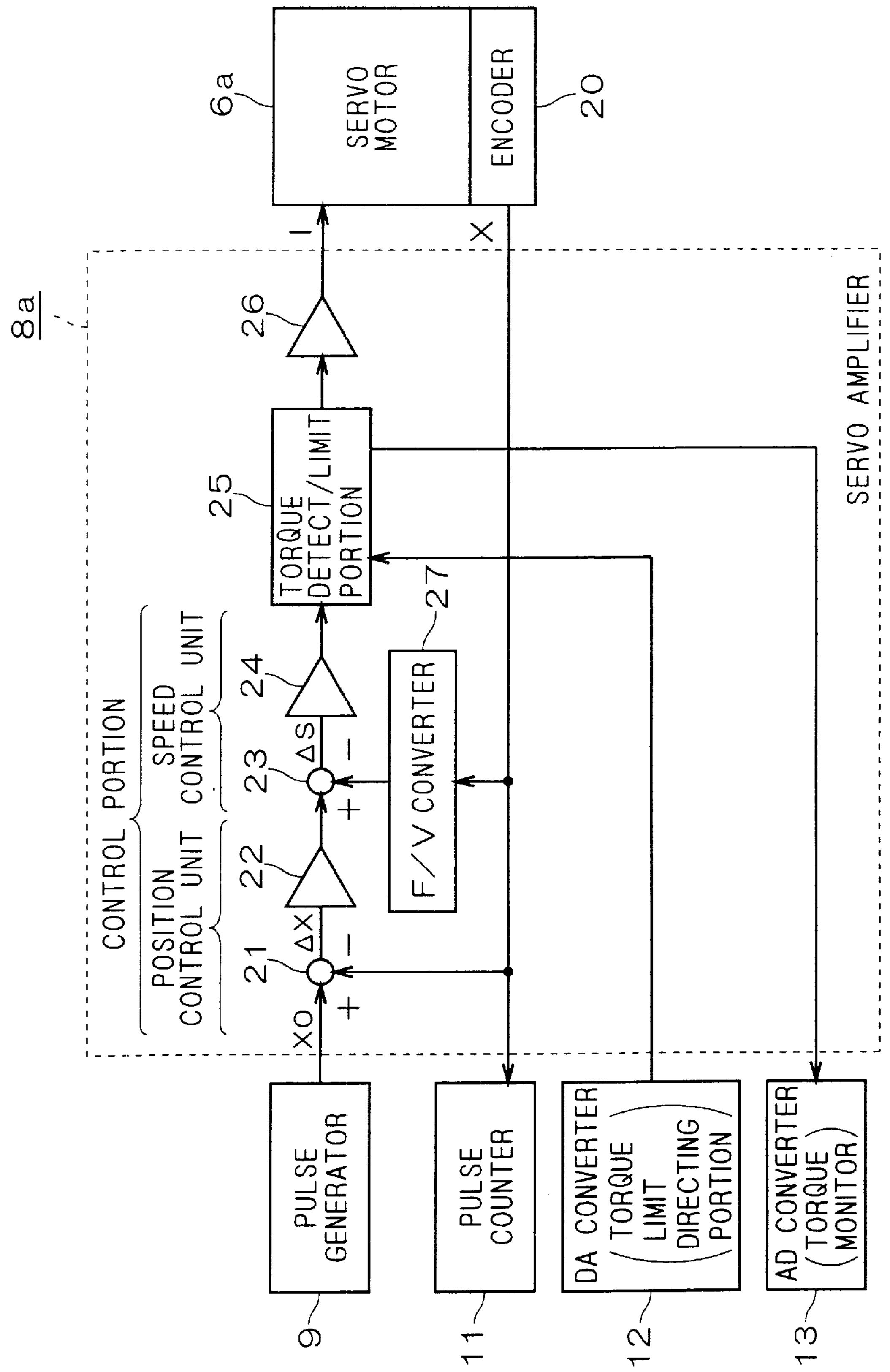
FIG. 2 is an internal block diagram showing the servo amplifier of FIG. 1.

FIG. 2 is a block diagram showing the inside structure of the servo amplifier 8*a*, which is representative of the servo amplifiers 8*a* and 8*b*. The servo amplifier 8*a* is supplied with a directing value X0 related to the operating position of the servo motor 6*a* (i.e. the rotating position of the rotor) from the pulse generator 9 and a measured value X related to the operating position of the servo motor 6*a* from an encoder 20. The encoder 20 is constructed as a known rotary encoder, for example. Similarly to those in the conventional machine 151, the directing value X0 and the measured value X are both represented by the number of pulses along the time series as shown in FIG. 8.

The subtracter 21 calculates the difference between the directing value X0 and the measured value X and outputs the calculated value as a positional deviation $\Delta X$.

The amplifier 22 amplifiers the positional deviation $\Delta X$. The subtracter 21 and the amplifier 22 form a position controlling unit. An F/V converter 27 converts the rate of time change of the measured value X, i.e., the frequency of the pulses representing the measured value X to a voltage signal. The subtracter 23 calculates the difference between the output signal from the amplifier 22 and the output signal from the F/V converter 27 and outputs the calculated value as a speed deviation $\Delta S$. The amplifier 24 amplifies the speed deviation $\Delta S$. The subtracter 23, amplifier 24 and F/V converter 27 form a speed controlling unit. The position controlling unit and the speed controlling unit are included in the control portion of the invention.

The output signal from the amplifier 24 is inputted to a current amplifier 26 through a torque detecting/limiting portion 25. The current amplifier 26 amplifies the input signal and supplies a current I proportional in magnitude to the input signal to the servo motor 6*a*. Thus the control portion functions to control the current I so that the measured value X follows the directing value X0 at speed proportional to the difference between the measured value X and the directing value X0 .

The torque detecting/limiting portion 25 detects the torque of the servo motor 6*a* through the current I, for example, and sends the detected value to the AD converter 13. The torque detecting/limiting portion 25 also limits the input signal to the current amplifier 26 so that the detected value of the torque will not exceed a limit value of the torque indicated by the DA converter 12. Specifically, when the magnitude of the output signal from the amplifier 24 does not exceed a value corresponding to the torque limit value, the torque detecting/limiting portion 25 sends the output signal from the amplifier 24 to the current amplifier 26 as it is, but when the magnitude of the output signal from the amplifier 24 exceeds the value corresponding to the torque limit value, it sends the value corresponding to the torque limit value to the current amplifier 26 in preference to the output signal from the amplifier 24.

The measured value X outputted from the encoder 20 is inputted to the pulse counter 11, too. The CPU 10 executes arithmetic processing on the basis of the measured value X inputted through the pulse counter 11 and the detected value of the torque inputted through the AD converter 13. The directing value X0 is then outputted through the pulse generator 9 and the torque limit value is outputted through the DA converter 12 on the basis of the value calculated in the arithmetic processing.

2. Operation

Figure 3:
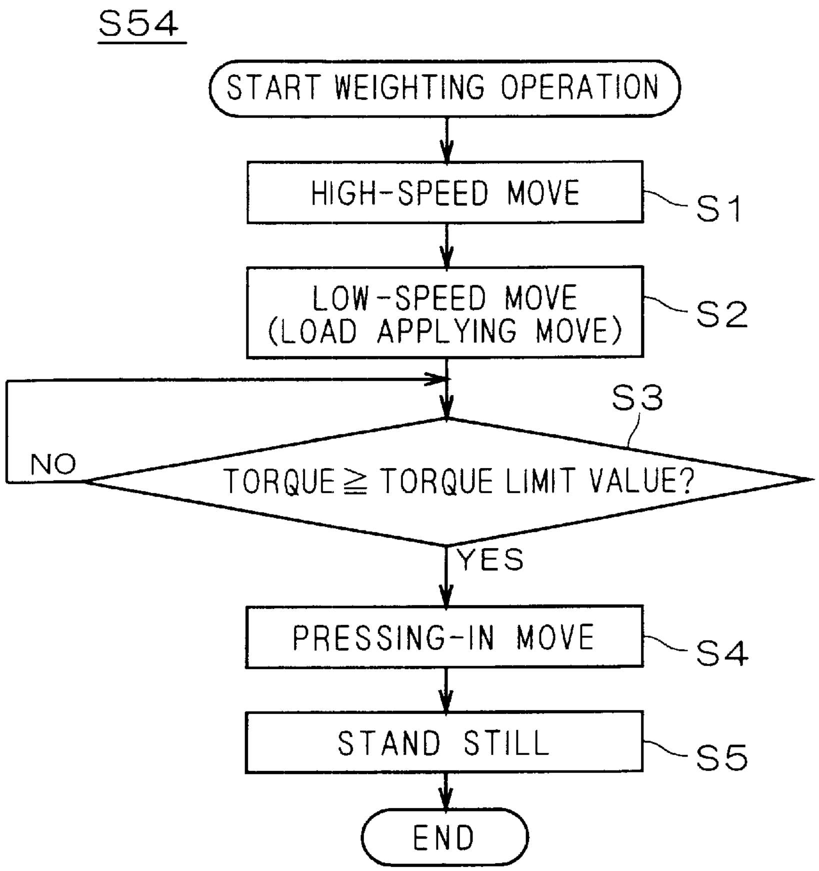
FIGS. 3 and 4 are flow charts showing the procedure of arithmetic processing by the CPU in FIG. 1.

The CPU 10 executes the arithmetic processing along the procedure shown in FIG. 9. However, unlike the conventional machine 151, the machine 101 executes the arithmetic processing in the weighting operation and withdrawing operation according to the flow charts shown in FIGS. 3 and 4. FIG. 3 shows the internal flow of step S54 as a representative of steps S54 and S55, and FIG. 4 shows the internal flow of step S57 as a representative of steps S57 and S58.

Figure 4:
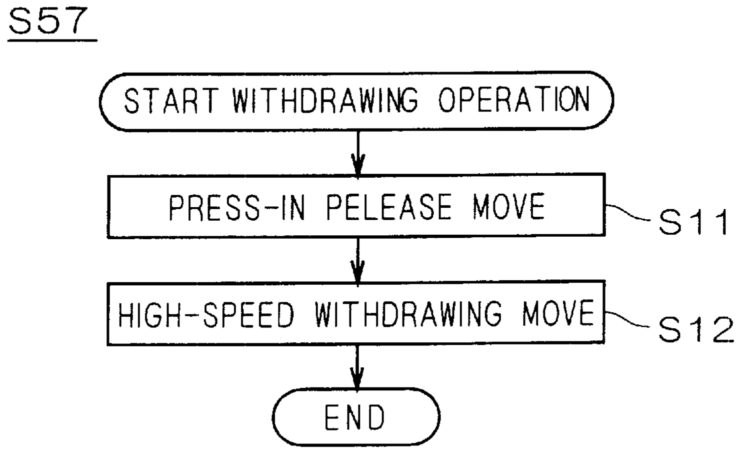
Figure 5:
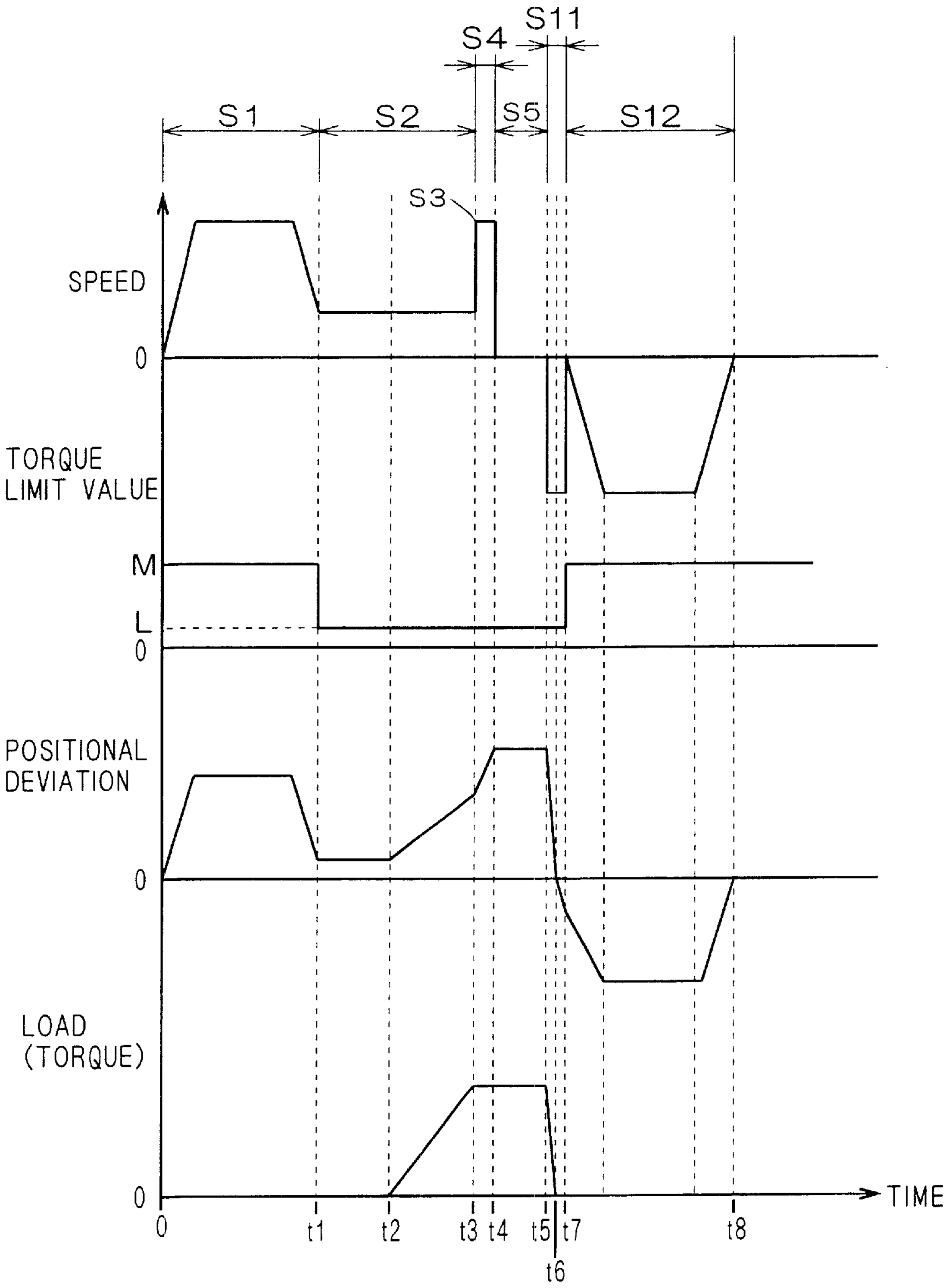
FIG. 5 is a timing chart used to explain operation of the machine of FIG. 1.

FIG. 5 is a timing chart showing variations of the target value of the operating speed (i.e. the rate of change in the directing value X0), a torque limit value, the positional deviation $\Delta X$, and the torque of the servo motor 6*a* in the weighting operation and the withdrawing operation carried out on the basis of the processings shown in FIGS. 3 and 4. Now, referring to FIGS. 3 to 5, the weighting operation and the withdrawing operation of the machine 101 will be described.

When the weighting operation is started, first, the moving mold 4*a* is driven to move in the mold-closing direction at high speed (step S1). During this operation, the target value of the operating speed first increases from zero and stays at a high value when the directing value X0 reaches a given reference value. The target value of the operating speed then decreases when the directing value X0 reaches another reference value. Subsequently, the target value of the operating speed is maintained at a constant low value when the directing value X0 reaches still another reference value (step S2).

Similarly to those in the machine 151, the reference values for defining the operating positions at which the target value of operating speed is changed are previously set through teaching performed prior to the processing in FIG. 9. The reference value defining the timing for changing from the high-speed moving operation based on step S1 to the low-speed moving operation based on step S2 is set so that the moving mold 4*a* is located at such a position that it does not abut on the fixed mold 3*a* when the directing value X0 reaches that reference value.

Hence the moving mold 4*a* moves at high speed from the standby position toward the fixed mold 3*a*, whose speed decreases before it hits on the fixed mold 3*a*, and then the moving mold 4*a* moves at low speed toward the fixed mold 3*a*. This reduces the travel time and also alleviates the impact produced when the moving mold 4*a* and the fixed mold 3*a* hit on each other.

At time t1 at which the operation changes from the high-speed moving operation to the low-speed moving operation, the CPU 10 lowers the torque limit value outputted through the DA converter 12 from a maximum value M set before then to a lower limit value L. The limit value L is taught in advance as a value corresponding to the pressing force applied to the moving mold 4*a* in the press work.

The moving mold 4*a* hits the fixed mold 3*a* at a certain point of time in the lowspeed moving operation (at time t2). While the moving mold 4*a* moves at speed approximately equal to the target value until it hits on the fixed mold 3*a*, it cannot maintain the speed corresponding to the target value after hitting. Accordingly, after hitting, the positional deviation ΔX increases. Then the speed deviation ΔS increases accordingly and the current I increases. As a result, the torque of the servo motor 6*a* increases. That is to say, the moving mold 4*a* is pressurized against the fixed mold 3*a* through an increasing pressing force.

At a certain point of time in the period in which the pressing force is increasing (at time t3), the torque of the servo motor 6*a* reaches the limit value L. The CPU 10 detects this through the AD converter 13 (step S3) and then it raises up the rate of change in the directing value X0, i.e. the target value of the operating speed (step S4). As a result, the directing value X0 rapidly changes in the mold-closing direction, and the positional deviation ΔX rapidly increases accordingly. However, the torque stays at the limit value L because of the function of the torque detecting/limiting portion 25. Accordingly the moving mold 4*a* is pressed by a constant pressing force corresponding to the limit value L.

When the directing value X0 reaches a further reference value (at time t4), the pressing-in movement operation based on step S4 is ended and the process moves to step S5, and the operating-speed target value is maintained at zero. That is to say, the directing value X0 is held at a certain value. In this standing-still operation, the moving mold 4*a* is continuously pressed against the fixed mold 3*a* by the constant pressing force corresponding to the limit value L. Press work is carried out throughout from the beginning of pressing to the standing-still operation. When a previously set certain time has elapsed (at time t5), the standing-still operation ends and the withdrawing operation is started.

When the withdrawing operation is started, the operating-speed target value is set to a negative large value, e.g. a value whose magnitude is equal to that of the operating-speed target value in the pressing-in movement operation in step S3 and whose sign is inverted. As a result, the moving mold 4*a* is driven to move at high speed in the mold-opening direction (step S11). Hence the torque of the servo motor 6*a* rapidly decreases.

At a certain point of time in the press-in releasing movement operation (at time t6), the moving mold 4*a* separates from the fixed mold 3*a*. At this time, the torque of the servo motor 6*a* becomes zero and then the pressing force applied to the moving mold 4*a* also becomes zero. The directing value X0 further changes in the mold-opening direction to reach still another reference value (at time t7), and then the press-in releasing movement operation ends and the high-speed withdrawing operation based on the processing in step S12 is started. The reference value defining the timing for changing from the press-in releasing movement operation to the high-speed withdrawing operation (time t7) is set so that the moving mold 4*a* is at a location separated by a given distance or more from the fixed mold 3*a* when the directing value X0 reaches this reference value.

At time t7, the torque limit value is raised from the limit value L to the maximum value M. In the high-speed withdrawing operation after time t7, the operating-speed target value increases from zero in the mold-opening direction, stays at a high value when the directing value X0 reaches a given reference value, and then decreases to zero when the directing value X0 reaches another reference value. Thus the moving mold 4*a* returns to the standby position (at time t8).

The number of pulses of the reverse rotation directing signal CCW outputted as the directing value X0 in the high-speed withdrawing operation is equal to the number of pulses of the normal rotation directing signal CW outputted in step S1 (high-speed moving operation) and step S2 (low-speed moving operation). Then the pressing force applied to the moving mold 4*a* is quickly released and the moving mold 4*a* returns to the standby position at high speed.

3. Advantages

In contrast with the conventional machine 151, the machine 101 operating as described above has the following advantages. First, the directing value X0 is further advanced in the mold-closing direction in the pressing-in movement operation after the torque has reached the limit value L, so that the moving molds 4*a* and 4*b* can be pressed by the constant pressing force corresponding to the limit value L even if the intervals between the moving molds 4*a* and 4*b* and the fixed molds 3*a* and 3*b* vary due to mutual interference between the two sets of molds. Specifically, even when a factor to vary the pressing force occurs due to mutual interference between the two sets of molds, it is possible to absorb its effect and perform the press work with stable load. This enhances the accuracy of the press work.

Also, since the pressing-in movement is performed at high speed, it is possible to quickly realize the highly stable pressing force. Particularly when the moving molds 4*a* and 4*b* arrive at the fixed molds 3*a* and 3*b* at different points of time, this more effectively avoids the problem of application of excessive load to the mold that has arrived earlier.

Moreover, the limit value of the torque is lowered as the operation changes from the high-speed moving operation to the low-speed moving operation and the limit value of the torque is raised as the operation changes from the press-in releasing movement operation to the high-speed withdrawing operation, which enables stable load to be exerted in the press work and reduces the time required for the moving molds 4*a* and 4*b* to travel, thus enhancing the efficiency of the work.

Further, since the press-in releasing movement operation is performed with the torque limit value maintained at low value and the torque limit value is raised after the molds are opened by a given distance or more, it is possible to effectively avoid the problem even when the moving molds 4*a* and 4*b* separate from the fixed molds 3*a* and 3*b* at different points of time.

4. Modifications (1) The description above has shown the machine in which two sets of molds are coupled to the common frame stand 16. However, the present invention can generally be applied in a form in which a plurality of sets of molds are coupled to a common frame stand 16.

(2) The transmission mechanism for transmitting the power from the servo motors 6*a* and 6*b* to the moving molds 4*a* and 4*b* is not limited to the ball threads 7*a* and 7*b*, but other mechanism such as belt may be adopted instead. In the invention, the wording "the operating position of the motor" is not limited to the rotating position of the rotor, but it may be something else generally related to the operation of the motor, such as the amount of movement of the ball threads 7*a* and 7*b*, for example.

While the invention has been described in detail, the foregoing description is in all aspects illustrative and not restrictive. It is understood that numerous other modifications and variations can be devised without departing from the scope of the invention.

What is claimed is:

1. A method of manufacturing pressed products characterized by manufacturing the pressed products by performing press work by using a press machine having a plurality of fixed molds and a plurality of motors provided on a common stand, wherein said plurality of motors individually drive moving molds respectively in pairs with said plurality of fixed molds to perform press work, said method comprising:

providing a plurality of amplifiers for passing cut individually through said plurality of motors; and individually controlling said plurality of amplifiers to realize weighing operation of moving said plurality of moving molds in mold-closing direction and pressing said plurality of moving molds respectively against said plurality of fixed molds and withdrawing operation of moving said plurality of moving molds in mold-open direction, wherein each of said plurality of amplifiers performs the steps of:

calculating an amount of current to be passed through a corresponding one of said plurality of motors so that a measured value of operating position of the corresponding motor follows a directing value, and sending said amount of said current calculated by said control portion to said corresponding motor while limiting the same so that torque of said corresponding motor does not exceed a limit value, and wherein in said weighting operation, said amplifier control portion further advances said directing value for each of said plurality of amplifiers in said mold-closing direction after said torque reaches said limit value.

2. A press machine having a plurality of fixed molds and a plurality of motors provided on a common stand, wherein said plurality of motors individually drive moving molds respectively in pairs with said plurality of fixed molds to perform press work, said press machine comprising:

a plurality of amplifiers for passing current individually through said plurality of motors; and an amplifier controlling portion for individually controlling said plurality of amplifiers to realize weighting operation of moving said plurality of moving molds in mold-closing direction and pressing said plurality of moving molds respectively against said plurality of fixed molds and withdrawing operation of moving said plurality of moving molds in mold-opening direction, wherein each of said plurality of amplifiers comprises, a control portion for calculating an amount of current to be passed through a corresponding one of said plurality of motors so that a measured value of operating position of the corresponding motor follows a directing value, and a torque control portion for sending said amount of said current calculated by said control portion to said corresponding motor while limiting the same so that torque of said corresponding motor does not exceed a limit value, and wherein in said weighting operation, said amplifier controlling portion further advances said directing value for each of said plurality of amplifiers in said mold-closing direction after said torque reaches said limit value.

3. The press machine according to claim 2, wherein in said weighting operation, said amplifier controlling portion advances said directing value for each of said plurality of amplifiers in said mold-closing direction before said torque reaches said limit value and lowers rate of change in said directing value before corresponding pair of said moving and fixed molds come in contact.

4. The press machine according to claim 3, wherein in said weighting operation, said amplifier controlling portion raises up the rate of change in said directing value for each of said plurality of amplifiers after said torque reaches said limit value.

5. The press machine according to claim 3, wherein in said weighting operation, said amplifier controlling portion lowers said limit value for each of said plurality of amplifiers at the same time as lowering the rate of change in said directing value before said corresponding pair of said moving and fixed molds come in contact.

6. The press machine according to claim 2, wherein in said withdrawing operation, said amplifier controlling portion advances said directing value for each of said plurality of amplifiers in said mold-opening direction while maintaining said limit value until corresponding pair of said moving and fixed molds open by a given amount or more, and then raises said limit value.

7. The press machine according to claim 2, wherein in said weighting operation, said amplifier controlling portion advances said directing value for each of said plurality of amplifiers in said mold-closing direction after said torque reaches said limit value, thereafter holds said directing value at a given value in a given period.

8. The press machine according to claim 2, wherein said amplifier controlling portion outputs, as said directing value for each of said plurality of amplifiers pulses along time series each corresponding to a certain amount of operation of said corresponding motor in said mold-opening direction and said mold-closing direction.

* * * * *